UNITED STATES PATENT OFFICE.

JACOB BOUMA, OF THE HAGUE, NETHERLANDS, ASSIGNOR OF ONE-HALF TO SIKKO BEREND SELHORST, OF THE HAGUE, NETHERLANDS.

PROCESS OF MANUFACTURING A SUGARLESS FOOD PRODUCT.

No. 855,928.     Specification of Letters Patent.     Patented June 4, 1907.

Application filed September 26, 1904. Serial No. 226,045.

*To all whom it may concern:*

Be it known that I, JACOB BOUMA, a subject of the Queen of the Netherlands, residing at 44 Bazarstraat, The Hague, Kingdom of the Netherlands, have invented a certain new and useful Process of Manufacturing a Sugarless Food Product Derived from Milk, of which the following is a specification.

This invention relates to a process for manufacturing a sugarless food product derived from milk, which, on being boiled will not coagulate, and, owing to the absence of sugar of milk, is suitable for invalids that are prohibited from taking sugar, for example, those suffering from diabetes, or abnormal fermentation processes in the stomach or intestines.

Although the composition of ordinary cow's milk has been altered by various methods, in order to render the same available as nutriment for invalids and other persons for whom ordinary cow's milk is not suitable, such methods have all been directed toward altering the content of fat or casein in the milk, or altering the nature of these constituents. According to the present invention this conversion of the milk is effected by removing the sugar therefrom in a simple manner; the casein and the butter fat substantially remain unaltered.

For carrying out the process the fat is first removed therefrom by centrifugal action. From the cream thus obtained the sugar is then removed by diluting it with water and then again subjecting it to centrifugal action, until the fat, freed from sugar, is obtained in its original degree of concentration.

From the skim milk separated from the cream the casein is precipitated in the known manner by means of acetic acid. The liquid containing the milk sugar is filtered off, the residue is, if necessary, washed and then dissolved in water, to which is added so much dilute soda lye that the opalescent solution obtained has still a weak acid reaction. To this solution is then added some soluble lime salt such as calcium chlorid, common salt, crystallose, as also a soluble phosphate salt, preferably phosphate of soda. The solution thus obtained is then combined with the milk fat previously obtained by centrifugal action and washing. In consequence of the presence of the lime salt the opalescent casein solution again assumes the natural white appearance of the milk; the common salt, and crystallose of the prepared milk give it the necessary salt and sweet flavor again; the phosphate of soda imparts to the casein solution an amphoteric reaction, which prevents the coagulation in boiling.— The milk thus prepared is practically free from sugar as only the slightest traces remain.

As an example of the proportions of the ingredients employed for 100 liters of milk, attention is called to the following: 20 percent. soda lye, 275 c. c. m.; phosphate of soda, 875 c. c. m.; 1 percent. of crystallose (sodium salt of methyl-saccharine), 250 c. c. m.; 20 percent. solution of calcium chlorid, 600 c. c. m.; common salt, 75 grams; washed cream containing 30 percent. of fat, 11 liters.

The relative proportions of the fatty substance and albumen solution used can be varied according to the nature and conditions of ill health to be treated.

Having thus described the nature of my said invention, and the best means I know of carrying the same into practical effect, I claim:—

A process of manufacturing a sugarless food product derived from milk consisting in separating the cream from the milk, then diluting the cream with water and separating the fat therefrom by centrifugal action, precipitating the casein from the residue and removing the liquid containing the sugar, then washing and diluting the casein with water, then adding to the casein a solution of soda lye, common salt, crystallose, phosphate of soda, and a lime salt, and then combining with the solution the sugar freed fat, substantially in the proportions specified.

In testimony whereof I have hereunto set my hand in presence of two subscribing witnesses.

JACOB BOUMA.

Witnesses:
     MARINUS JULES SELHORST,
     CAMILLE MARIE AUGUSTE DE RYK.